Sept. 3, 1940.　　　　A. W. SHAW　　　　2,213,413
SAW GRINDER
Filed June 6, 1938　　　　2 Sheets-Sheet 1

INVENTOR
ALBERT W. SHAW
BY Charles J. Evans
HIS ATTORNEY

Sept. 3, 1940.   A. W. SHAW   2,213,413
SAW GRINDER
Filed June 6, 1938   2 Sheets-Sheet 2
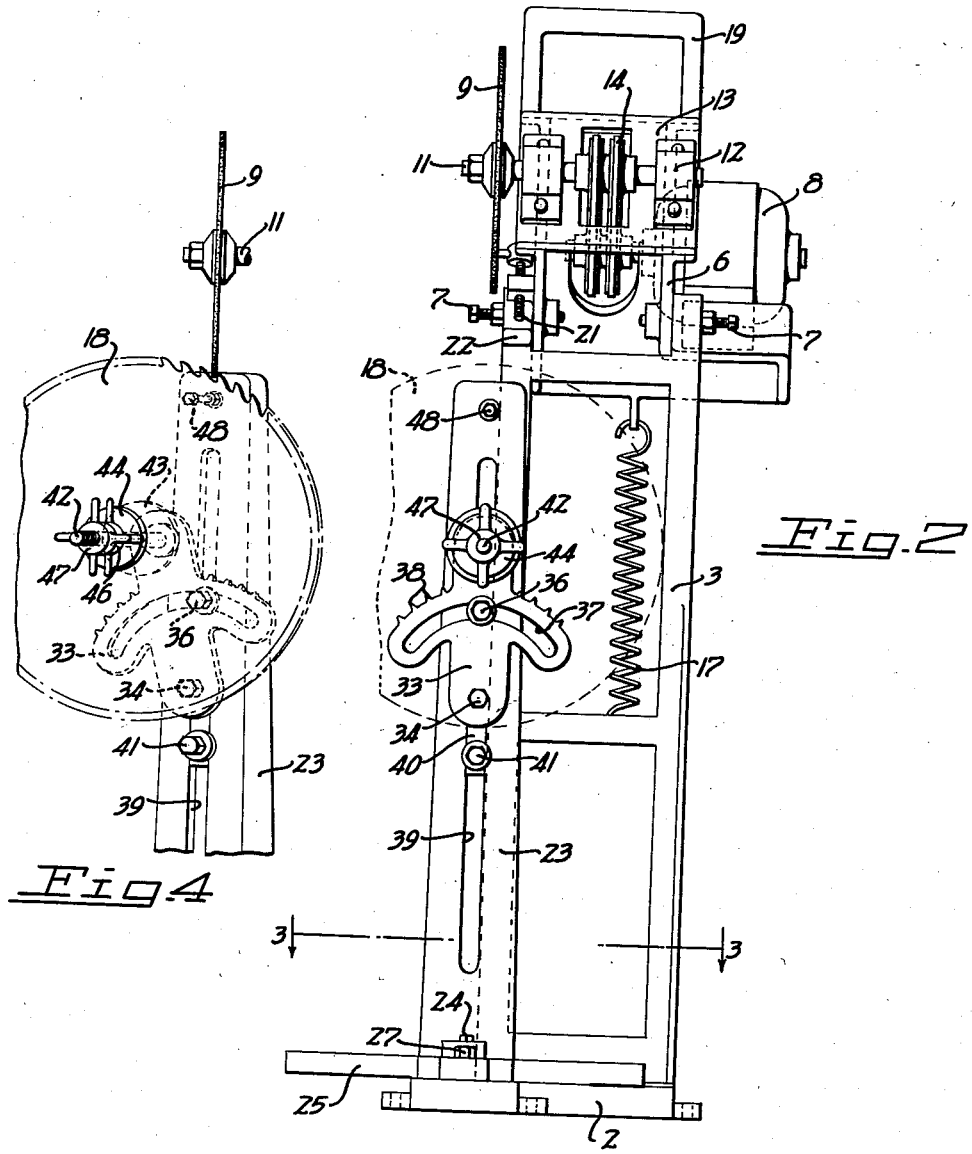
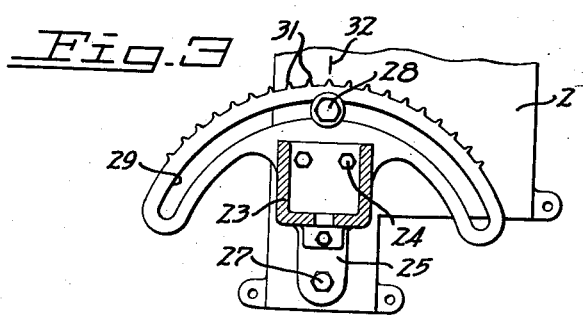
INVENTOR
ALBERT W. SHAW
BY Charles S. Evans
HIS ATTORNEY Patented Sept. 3, 1940

2,213,413

UNITED STATES PATENT OFFICE 2,213,413

SAW GRINDER

Albert W. Shaw, Oakland, Calif.

Application June 6, 1938, Serial No. 212,036

1 Claim. (Cl. 76—79)

My invention relates to a grinder for sharpening circular saws such as trimmer saws.

It is among the objects of my invention to provide a grinder having means for mounting the saw for adjustment about an axis lying in the plane of the saw to vary the width of sharpening bevel.

Another object of the invention is to provide means for mounting the saw for adjustment about an axis perpendicular to the plane of the saw to accommodate saws having teeth of different rake.

Other objects of the invention include the provision of means for adjusting the saw about its own axis for grinding different teeth; and of means for adjusting the saw relative to the grinding wheel to accommodate saws of different size and depth of tooth.

The invention possesses other objects and features of advantage, some of which, with the foregoing, will be set forth in the following description of my invention. It is to be understood that I do not limit myself to this disclosure of species of my invention as I may adopt variant embodiments thereof within the scope of the claim.

Referring to the drawings:

Figure 2 is a front elevational view of the same.

Figure 3 is a horizontal vertical sectional view looking down at the vertical axis adjustment, the plane of section being indicated by line 3—3 of Figure 2.

Figure 4 is a fragmentary front elevational view showing the saw in grinding position after the various adjustments have been made.

Figure 1:
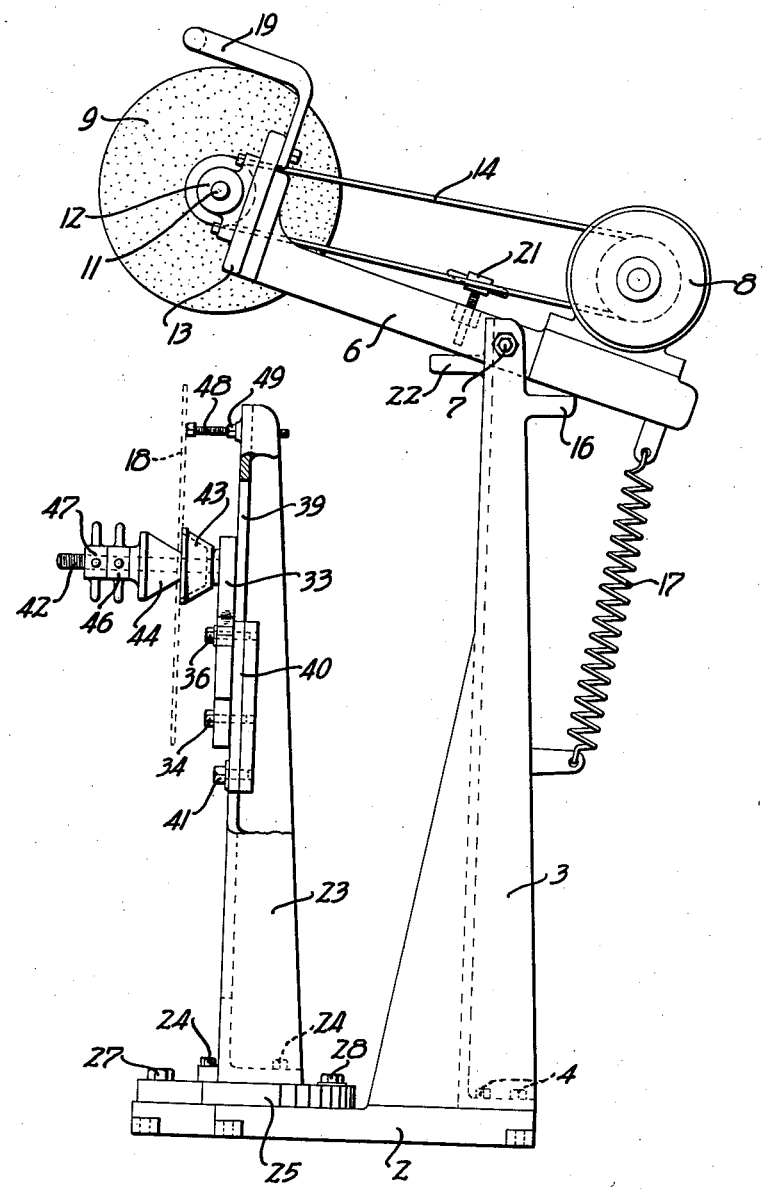
Figure 1 is a side elevational view of a grinder embodying the improvements of my invention; with portions of the saw support broken away to disclose the structure more clearly.

In terms of broad inclusion, the saw grinder of my invention comprises a grinding head movable between cutting and retracted positions. Means are provided for mounting the saw for adjustment about an axis lying in the plane of the saw, and also for adjustment about an axis perpendicular to the plane of the saw. Means are further provided for mounting the saw for adjustment about its own axis, and for adjusting the saw relative to the grinding wheel.

In greater detail, and referring to the drawings, my saw grinder comprises a frame having a base 2 with a grinding head support 3 fixed thereon by studs 4. Support 3 stands upright and is arranged on the back portions of base 2.

A grinding head is mounted on the upper end of support 3, and comprises an arm 6 pivoted intermediate its ends to the support on a horizontal axis by suitable pivot pins 7. The rear end of arm 6 provides a mounting for drive motor 8, and the front end of the arm provides a mounting for grinding wheel 9. By this arrangement the motor counterbalances the grinding wheel assembly.

Grinding wheel 9 is a relatively narrow disc, of any suitable grinding material, and is carried by a mandrel 11 journaled in suitable bearings 12 mounted on a face plate 13 fixed on the forward end of arm 6. The mandrel is connected to the motor by suitable means, as by a belt drive 14. Arm 6 of the grinding head is normally held tilted against a stop 16 by a spring 17 to hold grinding wheel 9 in its upward or retracted position. If motor 8 is heavy enough to accomplish this function, the spring 17 may be dispensed with; and if the motor is too heavy a spring connected between the support and the forward portions of the arm may be required to keep the motor end from dropping with too much force against the stop.

The forward end of the grinding head unit is depressed by the operator to lower wheel 9 into grinding position against saw 18. A yoke shaped bar 19 is preferably provided at the forward end of arm 6 to provide a handle. Depression of the grinding head is limited by an adjustable stop comprising a stop pin 21 threadably mounted on arm 6 and abutting a lug 22 on support 3. By this arrangement the lower limit or grinding position of the wheel may be changed by the operator.

Circular saw 18 to be sharpened is supported on the frame by an upstanding column or support 23 fastened by studs 24 to a foot plate 25 resting on the forward portions of frame base 2. Saw support 23 is shorter than grinding head support 3, and is thus positioned under the overhanging portions of the grinding head.

Means are provided whereby the saw may be angularly adjusted about a vertical axis, and for this purpose foot plate 25 is pivoted at its forward end to base 2 by a stud pin 27; this pin being so positioned that the vertical pivot axis of saw support 23 lies in the plane of saw 18 and vertically under the point where the grinding wheel 9 engages the saw. The saw support is held in a selected position of adjustment by a clamping stud 28 engaging an arcuate slot 29 in the foot plate. Projections 31 spaced say five degrees on the arcuate portions of the foot plate, and registering with a suitable mark 32 on the base, serve to facilitate angular adjustment.

Means are also provided for mounting the saw for adjustment about an axis perpendicular to the plane of the saw. To accomplish this a bracket plate 33 lying parallel with the saw is pivoted to support 23 by a pin 34 and is held in a selected position of adjustment by a clamping stud 36 engaging an arcuate slot 37 in the bracket. Projections 38 spaced say five degrees on arcuate portions of the bracket, serve to facilitate adjustment. Suitable marks may be provided on support 23 with which the projections 38 register, or the edges of the support itself may serve as such marks. These degree markings are only for approximation anyhow, since the final setting is made by the operator "sighting in" the saw.

Means are further provided for mounting the saw for vertical adjustment relative to the grinding wheel. For this purpose a vertical slot 39 is provided in the saw support 23, through which portions of a slidable backing plate 40 project and into which the pivot and clamping studs 34 and 36 are threaded. The backing plate is clamped to hold the bracket in a selected vertical position of adjustment by a stud and washer 41. Stud 36 which holds the bracket in adjusted angular position also functions to clamp the backing plate.

Means are still further provided for mounting the saw for adjustment about its own axis. Thus an outwardly extending spindle 42 is fixed on the upper end of bracket 33 to project through the center aperture of the saw. A recessed cone-shaped backing element 43 is first slipped on the spindle, and this is followed by the saw, and then by a conical centering element 44 engaging the saw aperture. These parts are clamped together by a nut 46 followed by a lock nut 47 threaded on the spindle. Conical element 44 centers the saw and also engages saws having different sized apertures.

A steady post 48 is preferably provided on support 23 back of the upper portions of the saw to provide a solid backing adjacent the point where grinding wheel 9 is working. This post is threaded into the support for adjustment, and is locked by a nut 49.

With these various adjustments it is possible to set the machine up for sharpening different types of circular saws, many of which cannot be handled with ordinary grinders. For example, trimmer saws having teeth with a large rake and a wide bevel can readily be sharpened with my improved grinder. Figure 4 shows the adjustments set for such a saw. It will be noted that bracket 33 is shifted over about the axis perpendicular to the plane of the saw to bring the cutting edge of a tooth up to the vertical for proper engagement by the grinding wheel. The bracket is also adjusted vertically to give the proper depth of cut when the grinding head is lowered against its limit stop 22. The adjustable stop permits a final setting to be made on this vertical adjustment.

It will also be noted that the saw support 23 has been turned on its vertical axis of adjustment to set the plane of the saw angularly with respect to the grinding wheel. This controls the width of bevel. An important feature to be noted is that the plane of the saw always lies in the vertical axis of adjustment, so that the saw may be turned on this axis without throwing out the other adjustments. Once the adjustments have been made, the operator starts motor 8 and then brings the grinding head down to its lower limit to sharpen the tooth.

Nuts 46 and 47 are then loosened and the saw rotated about its own axis to bring the next tooth to be sharpened up to grinding position. Every other tooth is sharpened in this way, without changing the other adjustments. The bracket 33 is then shifted over to the opposite side, and the angle of support 23 is reversed. This positions the saw for sharpening the alternate teeth which are beveled on the opposite side.

I claim:

A circular saw grinder comprising a frame, a support for the saw and pivoted to the frame for adjustment about an axis lying in the plane of the saw in all positions of the latter, a plate mounted for vertical adjustment on the support, a saw holding bracket pivotally mounted on the plate for adjustment about an axis intersecting said first mentioned axis in all positions of said bracket, and a grinding wheel mounted on the frame for movement toward and away from the saw, said first mentioned axis also lying in the plane of said wheel in all positions of the latter.

ALBERT W. SHAW.